(12) United States Patent
Hiraki et al.

(10) Patent No.: US 9,231,506 B2
(45) Date of Patent: Jan. 5, 2016

(54) SEMICONDUCTOR DEVICE, ELECTRICAL DEVICE AND CONTROL SIGNAL, GENERATION METHOD

(71) Applicant: LAPIS SEMICONDUCTOR CO., LTD., Yokohama (JP)

(72) Inventors: Koji Hiraki, Yokohama (JP); Toshiharu Okada, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 58 days.

(21) Appl. No.: 13/960,830

(22) Filed: Aug. 7, 2013

(65) Prior Publication Data

US 2014/0042942 A1 Feb. 13, 2014

(30) Foreign Application Priority Data

Aug. 13, 2012 (JP) ................. 2012-179598

(51) Int. Cl.
*H03K 5/00* (2006.01)
*H02P 6/14* (2006.01)
*H02P 6/00* (2006.01)

(52) U.S. Cl.
CPC ............... *H02P 6/142* (2013.01); *H02P 6/001* (2013.01); *H02P 6/008* (2013.01)

(58) Field of Classification Search
CPC ........ H02P 27/08; H02P 8/14; G06F 11/0733
USPC .................................... 318/400.13
See application file for complete search history.

(56) References Cited

U.S. PATENT DOCUMENTS

| 5,260,811 | A | * | 11/1993 | Morikawa | 358/474 |
| 7,791,306 | B2 | * | 9/2010 | Usui | 318/685 |
| 2008/0116841 | A1 | * | 5/2008 | Masamoto et al. | 318/801 |
| 2009/0140682 | A1 | * | 6/2009 | Watahiki | 318/494 |
| 2009/0168333 | A1 | * | 7/2009 | Saito et al. | 361/679.48 |

FOREIGN PATENT DOCUMENTS

| JP | 2006-174017 | 6/2006 |
| JP | 2007-174778 | 7/2007 |
| JP | 2011-019386 | 1/2011 |

* cited by examiner

*Primary Examiner* — Erick Glass
(74) *Attorney, Agent, or Firm* — Volentine & Whitt, PLLC

(57) ABSTRACT

A The present invention provides a semiconductor device, an electrical device, and a control signal generation method that enable easy generation of a given control signal even by a comparatively low cost and low processing power microcontroller, whereby a microcontroller of a motor control system includes a PWM device equipped with a PWM setting register. The PWM setting register includes a duty update cycle register, a duty update value register and a duty update-times number register. A PWM generator generates and outputs a PWM signal according to values set in each register of the PWM setting register. The PWM device is capable of generating and outputting a PWM signal automatically with the PWM generator according to setting values set in the PWM setting register, even without an interruption by the software (CPU).

6 Claims, 18 Drawing Sheets

FIG.9

| NO. | DUTY UPDATE CYCLE (COUNTS) | DUTY UPDATE VALUE | DUTY UPDATE-TIMES NUMBER |
|---|---|---|---|
| 1 | 100 | +20 | 4 |
| 2 | 10000 | -10 | 1 |
| 3 | 200 | -10 | 3 |
| 4 | 100 | -20 | 2 |

FIG.13

| NO. | DUTY UPDATE CYCLE (COUNTS) | DUTY UPDATE VALUE | DUTY UPDATE-TIMES NUMBER |
|---|---|---|---|
| 1 | 100 | +20 | 4 |
| 2 | 9800 | 0 | 1 |
| 3 | 200 | −10 | 4 |
| 4 | 100 | −20 | 2 |

SEMICONDUCTOR DEVICE, ELECTRICAL DEVICE AND CONTROL SIGNAL, GENERATION METHOD

CROSS-REFERENCE TO RELATED APPLICATION

This application claims priority under 35 USC 119 from Japanese Patent Application No. 2012-179598, filed on Aug. 13, 2012, the disclosure of which is incorporated by reference herein.

BACKGROUND OF THE INVENTION

1. Field of the Invention

The present invention relates to a semiconductor device, an electrical device and a control signal generation method, that generate control signals.

2. Description of the Related Art

Generally, brushless DC motors are often employed as fan motors. Such brushless DC motors generally are configured by a number of coil(s), and a rotor to which a permanent magnet is attached, with the rotor rotated by magnetization of the coils by supply of current thereto. Namely, the current in the coil is controlled according to the rotation position of the rotor, and the rotor is rotated by changing a magnetic field. A method of applying a constant voltage to both ends of the coil is suggested as one method of making current flow in and magnetizing the coil. In such a method, the rotation speed is controlled according to the voltage level applied. In contrast thereto, as a more general method, a method of applying a voltage using Pulse Width Modulation (PWM) is suggested to raise electromotive force efficiency. In such a method, the rotation speed is controlled by the duty ratio of the PWM signal.

A Hall device and back electromotive force during switching are employed to detect the rotation position of the rotor. A motor drive circuit switches polarity of voltage applied to the coil based on a timing from detecting a Hall signal or back electromotive force. In order to reduce motor drive noise in the vicinity of such a switching timing, a motor drive circuit that performs soft switching is employed to gently change the voltage and polarity applied to the coil. The effectiveness of motor drive noise reduction varies depending on characteristics such as the start timing of soft switching and the manner in which voltage is changed after the start of soft switching. A motor drive circuit is accordingly matched to the type of motor actually being employed and to conditions of use in order to minimize drive noise.

For example, in Japanese Patent Application Laid-Open (JP-A) No. 2007-174778, technology for driving is described that sets the soft switching start position at 62.5%, 75% or 87.5% of a half cycle of a Hall device signal, with the remaining region from there onwards of 37.5%, 25% or 12.5% divided into 8 or 16 steps of gradually reducing duty of a PWM signal applied to a coil.

Further, in JP-A No. 2011-19386, a technology that enables selecting a voltage change cycle (voltage change slope) during soft switching execution, and the soft switching execution period, by using a pre-set constant value, is disclosed.

Further, for example, JP-A No. 2006-174017 discloses a technology that manages a table of change amounts of duty ratio. In this technology, a program pre-written to ROM reads values from a table, and generates a PWM signal under control of the program configured from a combination of subroutines.

However, whichever of the above technologies is employed, flexible response still may not be made, in cases such as when one motor is replaced by a motor with different characteristics.

For example, in the technology described in JP-A No. 2007-174778, the soft switching start position (62.5%, 75% or 87.5% of a half cycle of a Hall device signal) and the duty change steps of the PWM signal during soft switching execution (8 steps or 16 steps) may be changed. However, it is necessary to change hardware (the motor drive circuit) in order to perform such change. Moreover, since there are only limited selectable positions, it may not be possible to set optimal characteristics for many motors.

For example, in the technology described in JP-A No. 2011-19386, the soft switching execution period may be changed by changing the values of the pre-set constant. However, start position of the soft switching may not be changed. Consequently, it is not possible to set optimal characteristics for many motors.

However, in the technology described for example in JP-A No. 2006-174017, High/Low switching over of each pulse of a PWM signal is implemented by interruption processing. Thus, in such technology, the burden may be increased by the software interruption processing, with the possibility arising that the processor is unable to keep up with the processing.

SUMMARY OF THE INVENTION

The present invention provides a semiconductor device, an electrical device, and a control signal generation method that may enable easy generation of a given control signal even by a comparatively low cost and low processing power microcontroller.

A first aspect of the present invention is a semiconductor device including: a control data storage section that stores control data containing at least, control signal data representing a control signal for controlling operation of a drive section, and update timing data representing an update timing of the control signal; a control signal generation section that generates a control signal based on the control data; and a storage control section that controls storage of control data in the control data storage section.

A seventh aspect of the present invention is an electrical device including: the semiconductor device of the above aspects of the present invention; a drive section whose operation is controlled by a control signal generated by the semiconductor device; and a driven member that is driven by the drive section.

An eighth aspect of the present invention is a control signal generation method including: storing in a control data storage section control data containing at least control signal data representing a control signal for controlling operation of a drive section and update timing data representing an update timing of the control signal; and generating a control signal based on the control data.

According to the above aspects, the present invention may easily generate a given control signal even with a comparatively low cost and low processing power microcontroller.

BRIEF DESCRIPTION OF THE DRAWINGS

Exemplary embodiments of the present invention will be described in detail based on the following figures, wherein:

FIG. 9 is an explanatory diagram illustrating a specific example of a duty update table in the second exemplary embodiment;

FIG. 13 is an explanatory diagram illustrating another specific example of a duty update table of the second exemplary embodiment;

DETAILED DESCRIPTION OF THE INVENTION

In order to enable a control signal of a motor to be changed easily and a target control signal to be generated easily, even in cases in which a motor has been replaced with one of different characteristics, the present invention provides semiconductor devices (motor control devices) and motor control methods that may control motors by using the software of a microcontroller, instead of dedicated hardware.

First motor control methods by semiconductor devices (motor control devices) where investigated, as illustrated in the following Comparative Example. Explanation follows regarding motor control methods by semiconductor devices (motor control devices) of the Comparative Example.

Comparative Example

Figure 14:
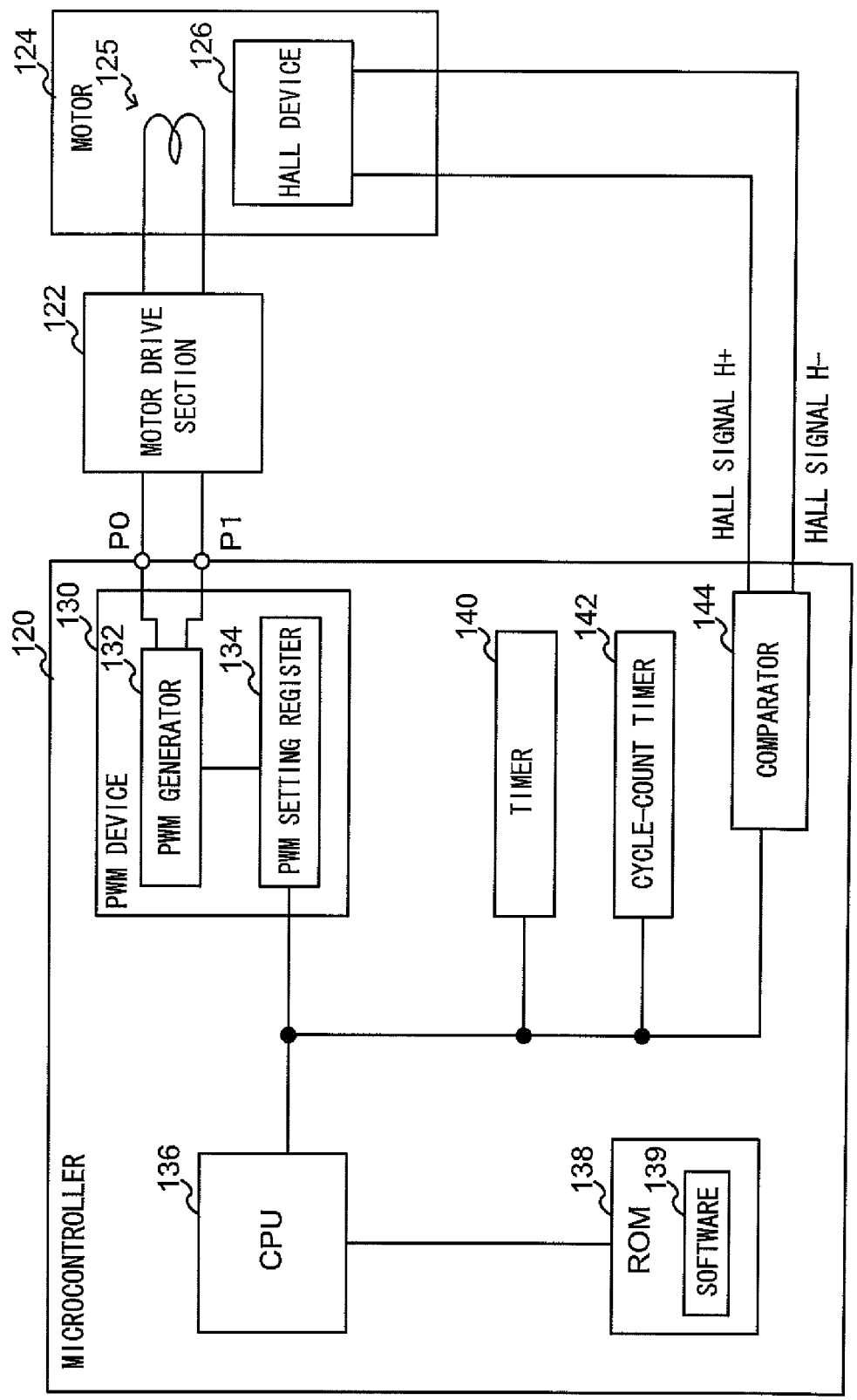
FIG. 14 is a schematic configuration diagram schematically illustrating a configuration of a motor control system of a Comparative Example.

FIG. 14 is a schematic configuration diagram illustrating a motor control system 112 of a Comparative Example.

The motor control system 112 of the Comparative Example is equipped with a microcontroller 120, a motor drive section 122 and a motor 124. The motor drive section 122 has a function to make a current flow in a coil 125 of the motor 124 according to a control signal (Pulse Width Modulation (PWM) signal) from the microcontroller 120. The motor 124 is equipped with the coil 125 and a Hall device 126. The Hall device 126 detects a rotation position of a rotor (not illustrated in the drawings) provided to the motor 124. Hall signals H+, H− that periodically change according to the position of the rotor are generated by the Hall device 126, and are output to a comparator 144 of the microcontroller 120.

The microcontroller 120 is equipped with a PWM device 130, a CPU 136, a ROM 138, a timer 140, a cycle-count timer 142 and the comparator 144.

Software 139 for overall control of the microcontroller 120 is stored in the ROM 138. Note that the ROM 138 may be configured by a re-writable, non-volatile memory stored with the software 139. The timer 140 sets a timing of soft switching. The cycle-count timer 142 measures the rotation cycles of the motor 124. Further, the comparator 144 compares the magnitude of the Hall signal H+ and the Hall signal H−, and outputs a signal at high (H) level or low (L) level according to the comparison result.

Figure 15:
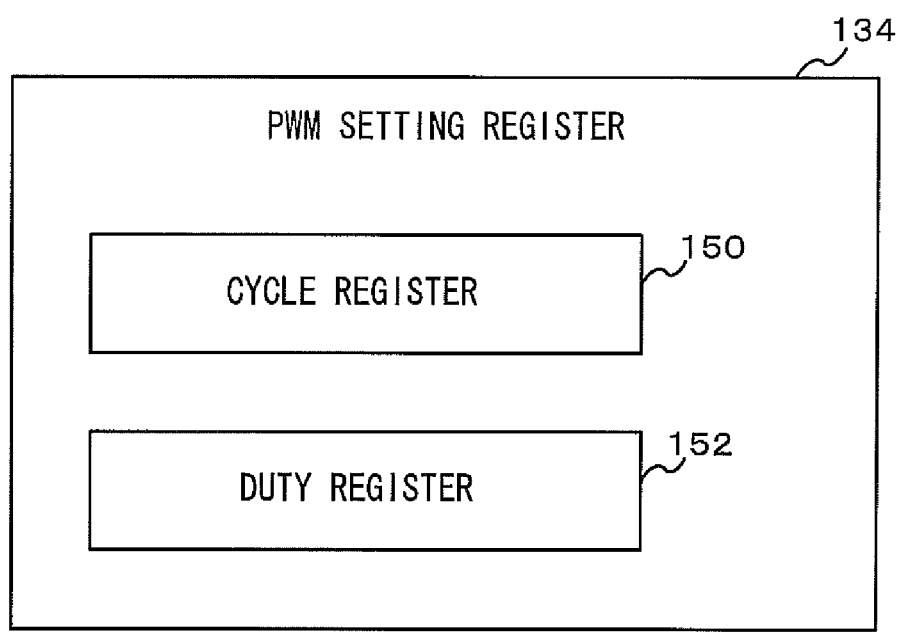
FIG. 15 is a schematic configuration diagram schematically illustrating a configuration of a PWM setting register of a Comparative Example.

The PWM device 130 generates a control signal (PWM signal) and outputs this to the motor drive section 122. The PWM device 130 is equipped with a PWM generator 132 and a PWM setting register 134. The PWM setting register 134 is stored with data for controlling the signal waveform of the PWM signal. FIG. 15 is a schematic configuration diagram illustrating an example of the PWM setting register 134. As illustrated in FIG. 15, the PWM setting register 134 is equipped with a cycle register 150 and a duty register 152. The cycle register 150 is for setting the cycle of the PWM signal. The duty register 152 is for setting the value of the duty ratio of the PWM signal (referred to below simply as duty). The PWM generator 132 generates a PWM signal based on the data stored in the PWM setting register 134.

Figure 16:
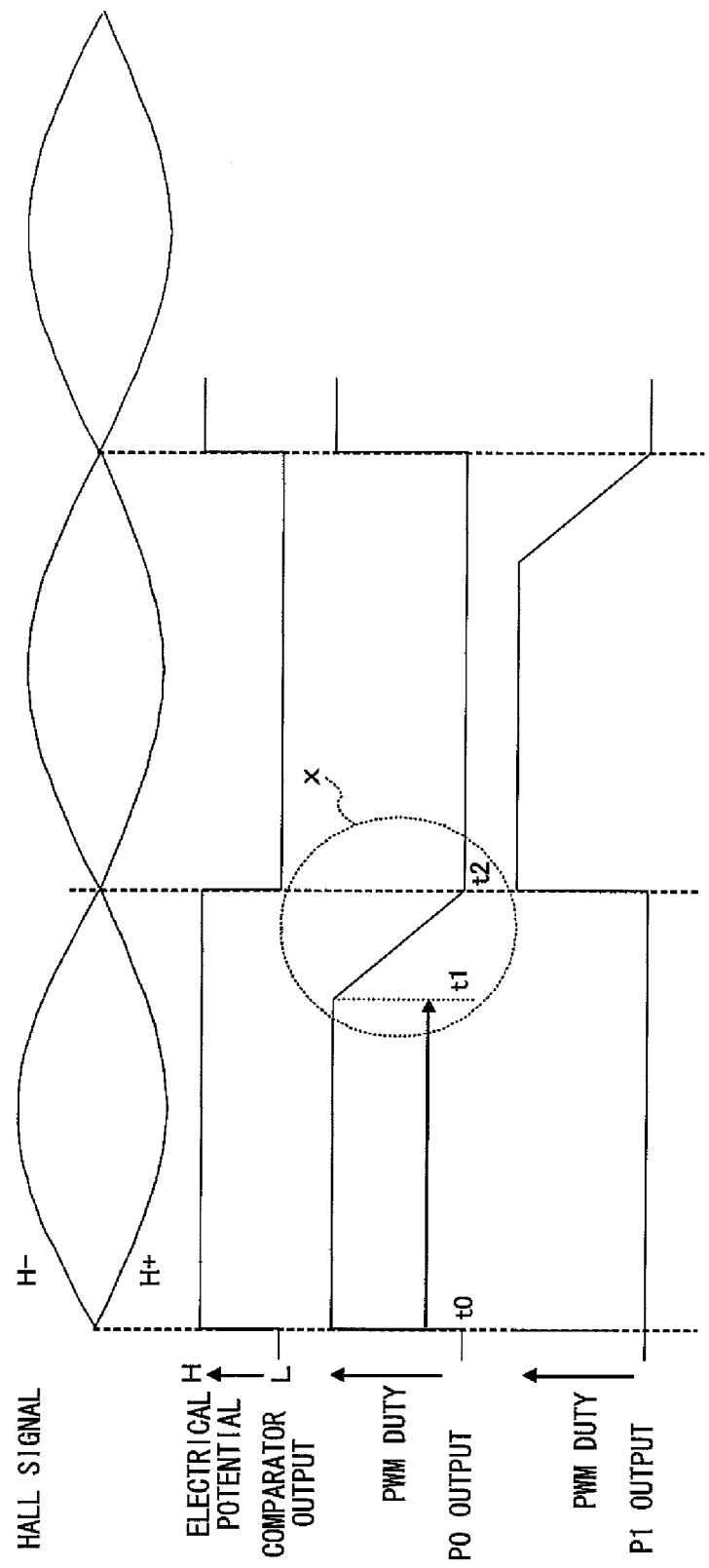
FIG. 16 is a timing chart of operation of a PWM device of a Comparative Example.

Explanation follows regarding an example of operation of the motor control system 112 of the Comparative Example. FIG. 16 illustrates an example of a timing chart for such operation.

A desired cycle and duty are set in the cycle register 150 and the duty register 152 of the PWM setting register 134, and operation of the PWM device 130 started. Then, the PWM device 130 generates the PWM signal with the PWM generator 132 according to setting values of the cycle register 150 and the duty register 152, and outputs the PWM signal to the motor drive section 122. Note that the PWM signal is output from either an output terminal P0 or an output terminal P1. Current according to the PWM signal is supplied by the motor drive section 122 to the coil 125 of the motor 124, and rotation of the motor is started.

On starting the rotation, the Hall signal H+ and the Hall signal H− are generated in synchronization with rotation by the Hall device 126 attached to the rotor. The comparator 144 compares the magnitude of the Hall signal H+ and the Hall signal H− and outputs an output signal of high (H) level or low (L) level according to the comparison result. In the cycle-count timer 142 the rotation cycle of the motor 124 is computed by measuring the pulse width of the output signal of the comparator 144.

Further, an interruption is generated at the same time as the level of the output signal of the comparator 144 is switched over. The PWM device 130 periodically switches over the output destination for output between the two output terminals, the output terminal P0 and the output terminal P1, at switching timings in the output signal level of the comparator 144, namely at each half cycle of output of the comparator 144. Specifically, in a case in which the PWM device 130 initially outputs a PWM signal to the output terminal P0, output from the PWM device 130 is temporarily stopped by the software 139 that has detected an interruption from the comparator 144. Then, the PWM device 130 changes the output destination of the output signal to the output terminal P1, sets a specific cycle and duty in the cycle register 150 and the duty register 152, and starts operation of the PWM device 130.

Figure 17:
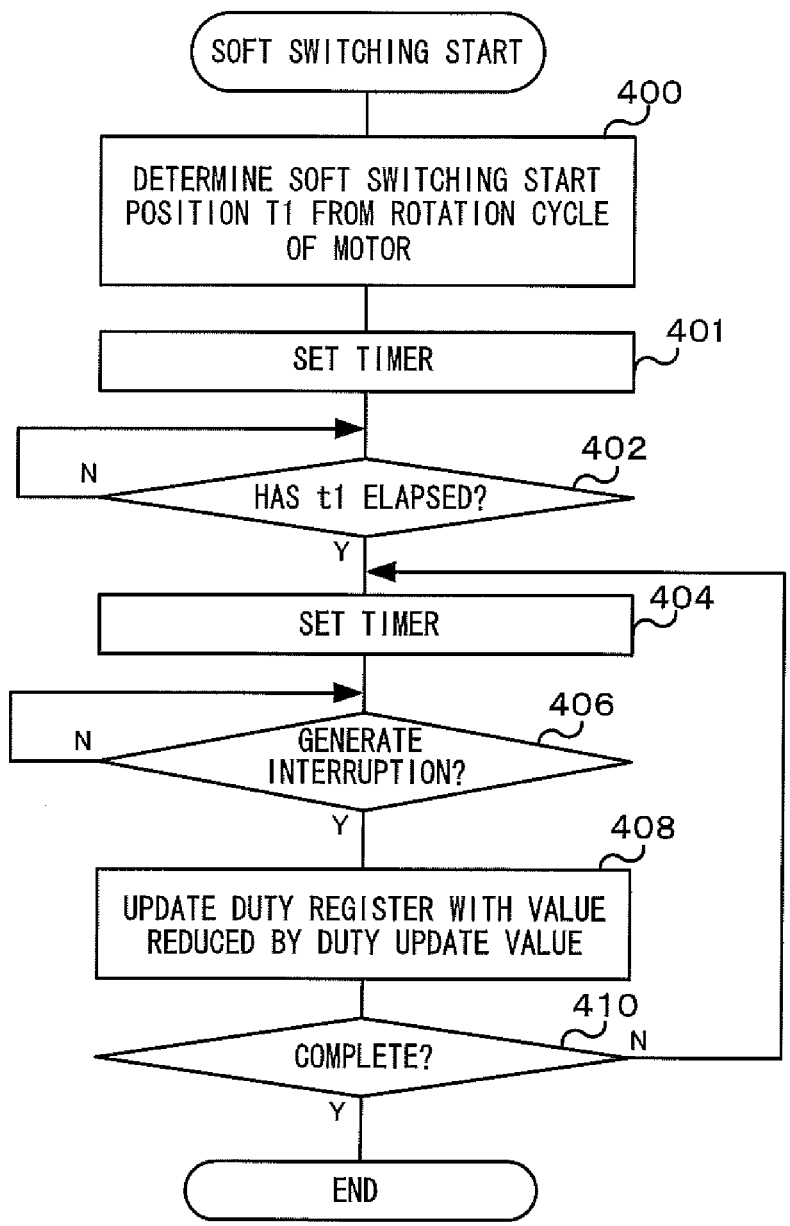
FIG. 17 is a flow chart illustrating an example of flow of soft switching operation by a motor control system of a Comparative Example.
Figure 18:
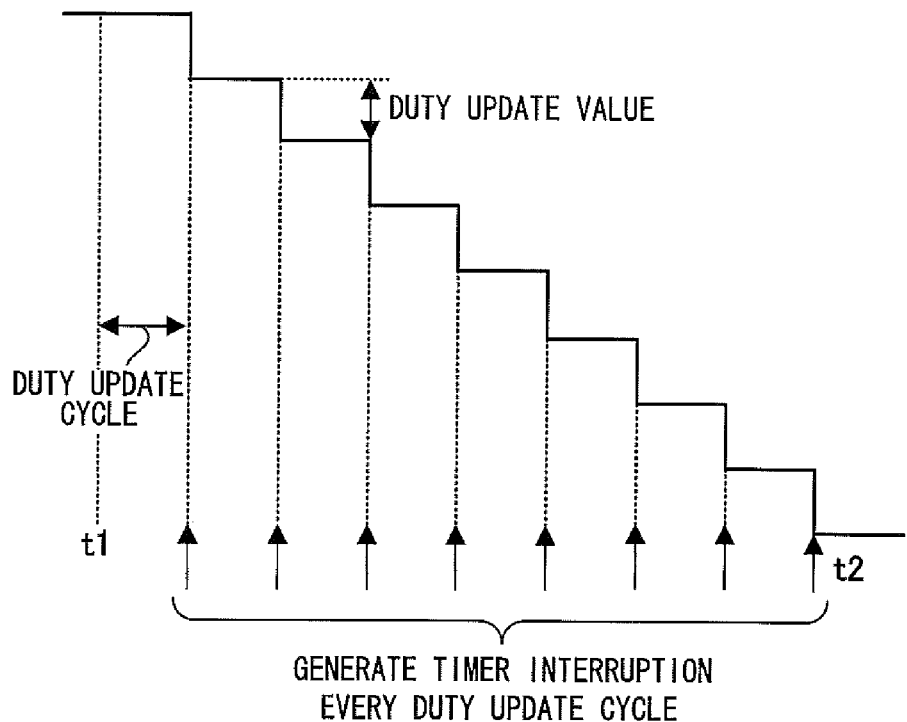
FIG. 18 is a timing chart illustrating duty of a PWM signal of a Comparative Example.

Explanation follows regarding operation in a case in which, at the end of a half cycle (rotation cycle) of the output of the comparator 144, the duty of the PWM signal output from the PWM device 130 is decreased at a constant slope by, for example, soft switching. A flow chart representing flow in a soft switching operation by the motor control system 112 in a Comparative Example is illustrated in FIG. 17. Further, a timing chart of the duty of the PWM signal being output is illustrated in FIG. 18. Note that FIG. 18 is an enlarged view illustrating the portion encircled with dotted line x in the timing chart illustrated in FIG. 16.

A soft switching start position (start timing) t1 from the measured rotation cycle of the motor according with the characteristics of the motor is determined by the software 139 (the CPU 136) (step 400 in FIG. 17).

The timer 140 measures the elapsed time from the start position of the rotation cycle of the motor (see t0 in FIG. 16), and, at a point in time when the elapsed time is t1 (step 402=Y in FIG. 17), sets the timer 140 (step 401 of FIG. 17) to generate an interruption with the software 139 (CPU 136). When an interruption is generated (step 402=Y in FIG. 17), the timer 140 is set (step 404 of FIG. 17) so as to generate an interruption at an interval (referred to below as duty update cycle) according to the slope of decrease in the output signal (duty) of the PWM device 130, using the software 139. Then to generate the interruption (step 406=Y in FIG. 17), the value in the duty register 152 in the software 139 is updated to a value reduced by a fixed value (referred to below as a duty update value) (step 408 in FIG. 17). Further, setting of the time, generation of an interruption, and updating of the duty, is repeated (step 410=N in FIG. 17) until the desired value (in this case duty=0) is achieved, thereby completing operation of the soft switching (step 410=Y in FIG. 17).

The soft switching start position t1, the duty update cycle and the duty update value may all be set by the software 139 to given values according to the type of motor, the rotation cycle and other conditions. Accordingly, the motor control system 112 may generate a given motor control signal (PWM signal). However, in this method, frequent interruptions are generated after the soft switching start for updating the duty. Generally, as a microcontroller employed in a compact and low cost fan motor, a comparatively low cost and low processing power microcontroller, at about 8-bits, is often employed. In such a microcontroller, there is a heavy load from processing of software to generate frequent interruptions during a soft switching operation, and therefore the microcontroller may be unable to keep up with the processing.

Thus, in order to enable application even to compact and low cost fan motors, the present invention provides motor control systems, called soft switching, that may enable a given motor control signal to be easily generated without generating frequent interruptions, even with a comparatively low cost and low processing power microcontroller. Detailed explanation follows regarding exemplary embodiments of the present invention.

First Exemplary Embodiment

Figure 1:
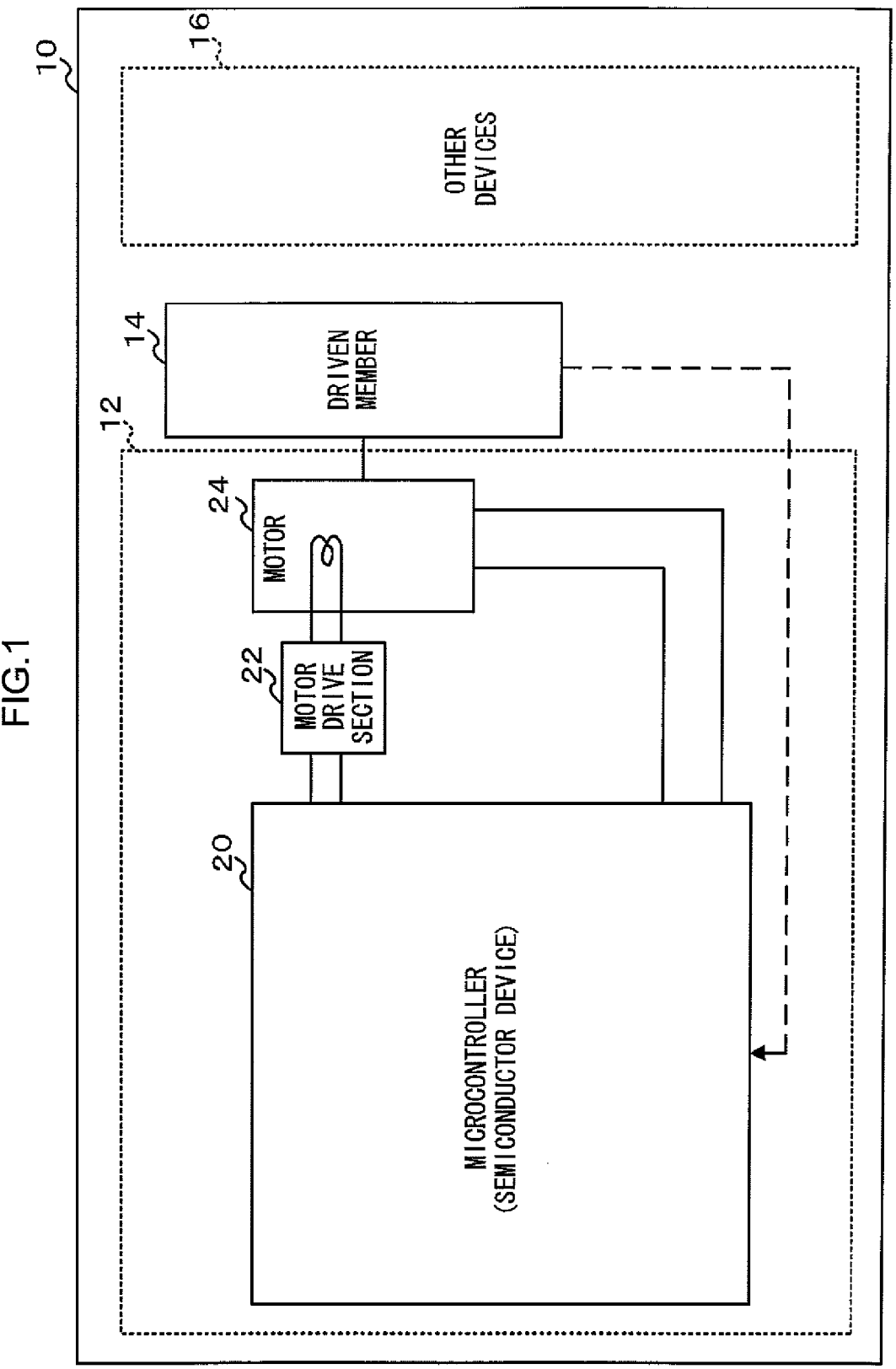
FIG. 1 is a schematic configuration diagram schematically illustrating a configuration of an electrical device of a first exemplary embodiment.

Explanation follows regarding a motor control device that is a semiconductor device of the present exemplary embodiment, with reference to the drawings. FIG. 1 illustrates a schematic configuration diagram of an electrical device equipped with a motor control system according to a semiconductor device (motor control device) of the present exemplary embodiment. Explanation follows regarding the present exemplary embodiment in which an electrical device, as illustrated in FIG. 1, includes a motor control system 12 that drives a motor 24 using a semiconductor device (microcontroller) 20.

An electrical device 10 of the present exemplary embodiment includes the motor control system 12 that includes a microcontroller 20, a motor drive section 22 and a motor 24, a driven member 14 that is driven (rotated) by the motor 24, and other devices 16. As a specific example, explanation follows of a case in which the electrical device 10 is a personal computer (PC), the other devices 16 are other devices (circuits), such as a mother board required for PC driving, and the driven member 14 driven by the motor 24 is a cooling fan for cooling heat generating portions, such as of the other devices 16.

Figure 2:
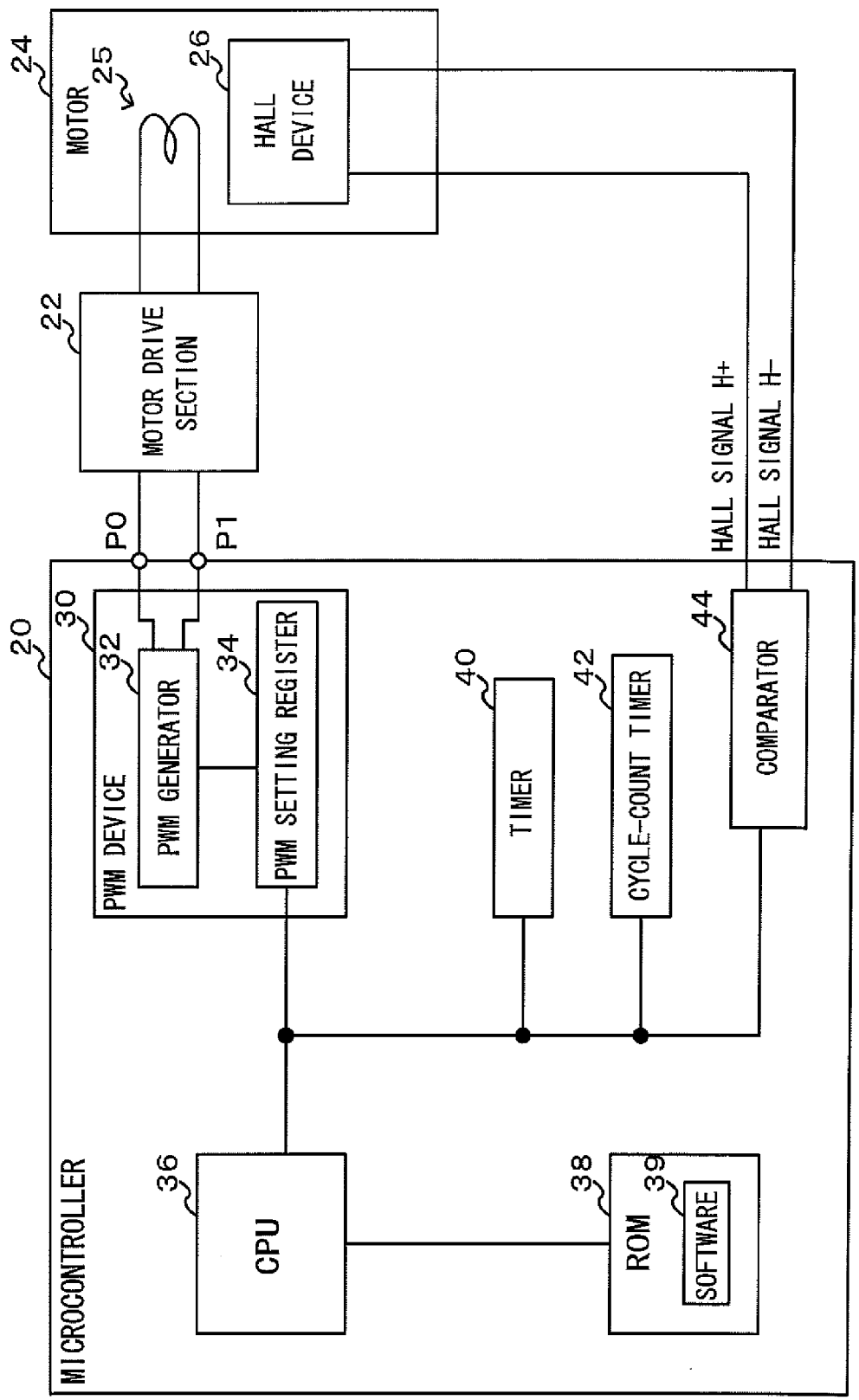
FIG. 2 is a schematic configuration diagram schematically illustrating a configuration of a motor control system of the first exemplary embodiment.

The motor control system 12 of the present exemplary embodiment controls driving of the motor 24 using a Pulse Width Modulation (PWM) signal. A schematic configuration diagram of the motor control system 12 of the present exemplary embodiment is illustrated in FIG. 2.

The motor control system 12 of the present exemplary embodiment, as described above, includes the microcontroller 20, the motor drive section 22 and the motor 24. The motor drive section 22 causes a current to flow in a coil 25 of the motor 24 according to the control signal (PWM signal) from the microcontroller 20. The motor 24 includes the coil 25 and a Hall device 26. The Hall device 26 detects the rotation position of a rotor (not illustrated in the drawings) provided to the motor 24. Hall signals H+, H−, that change in a complementary manner according to the position of the rotor, are generated by the Hall device 26, and the Hall signals H+, H− are output to a comparator 44 of the microcontroller 20.

The microcontroller 20, that is a motor control device to control driving of the motor 24, includes a PWM device 30, a CPU 36, a ROM 38, a timer 40, a cycle-count timer 42 and the comparator 44.

Software 39 for overall control of the microcontroller 20 is stored in the ROM 38. Note that the ROM 38 may be configured by a re-writable non-volatile memory stored with the software 39. The CPU 36 controls the microcontroller 20 overall by reading and executing the software 39.

The timer 40 includes a function to set a timing of soft switching. The cycle-count timer 42 measures the rotation cycles of the motor 24. The comparator 44 compares the magnitude of the Hall signal H+ and the Hall signal H− output from the Hall device 26 of the motor 24 and to output a signal at high (H) level or low (L) level according to the comparison result.

The PWM device 30 generates a control signal (PWM signal) and outputs this to the motor drive section 22. The PWM device 30 includes a PWM generator 32 and a PWM setting register 34. The PWM setting register 34 includes a function to store data for controlling the signal waveform of the PWM signal. The PWM generator 32 generates a PWM signal at a timing according to an operation clock based on the data stored in the PWM setting register 34.

Figure 3:
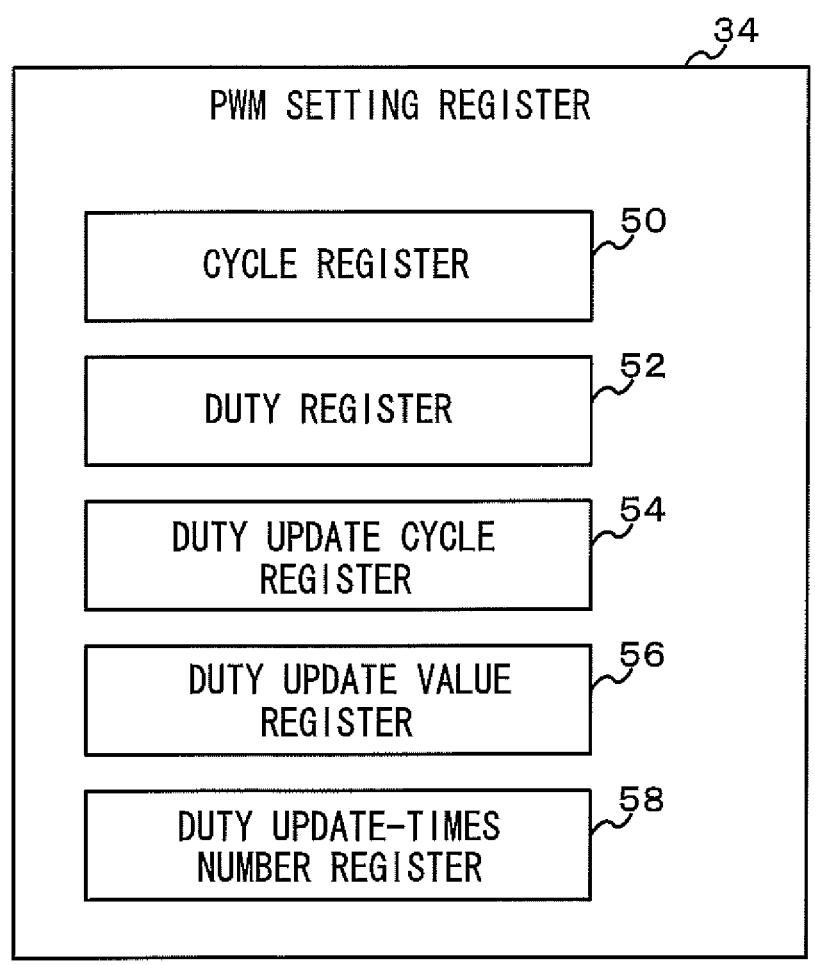
FIG. 3 is schematic configuration diagram schematically illustrating a configuration of a PWM setting register of the first exemplary embodiment.

FIG. 3 is a schematic configuration diagram illustrating a PWM setting register 34 of the present exemplary embodiment. As illustrated in FIG. 3, the PWM setting register 34 includes a cycle register 50, a duty register 52, a duty update cycle register 54, a duty update value register 56 and a duty update-times number register 58. The cycle register 50 sets the cycle of the PWM signal. The duty register 52 sets the value of the duty ratio (referred to below simply as duty) of the PWM signal.

The duty update cycle register 54 sets a duty update cycle. The duty update value register 56 sets a duty change amount. The duty update-times number register 58 sets a number of times to repeat the update cycles. Thus in the present exemplary embodiment, setting values are stored in the duty update cycle register 54, the duty update value register 56 and the duty update-times number register 58, for automatically changing the PWM signal duty. Thus the value of the duty of the PWM signal generated and output by the PWM device 30 (the PWM generator 32) may accordingly be automatically changed the set number of repeat times at a fixed cycle. Namely, in the present exemplary embodiment, during performing soft switching, the value of the duty of the PWM signal is automatically changed the set number of repeat times at a fixed cycle according to the settings of the duty update cycle register 54, the duty update value register 56 and the duty update-times number register 58.

Figure 4:
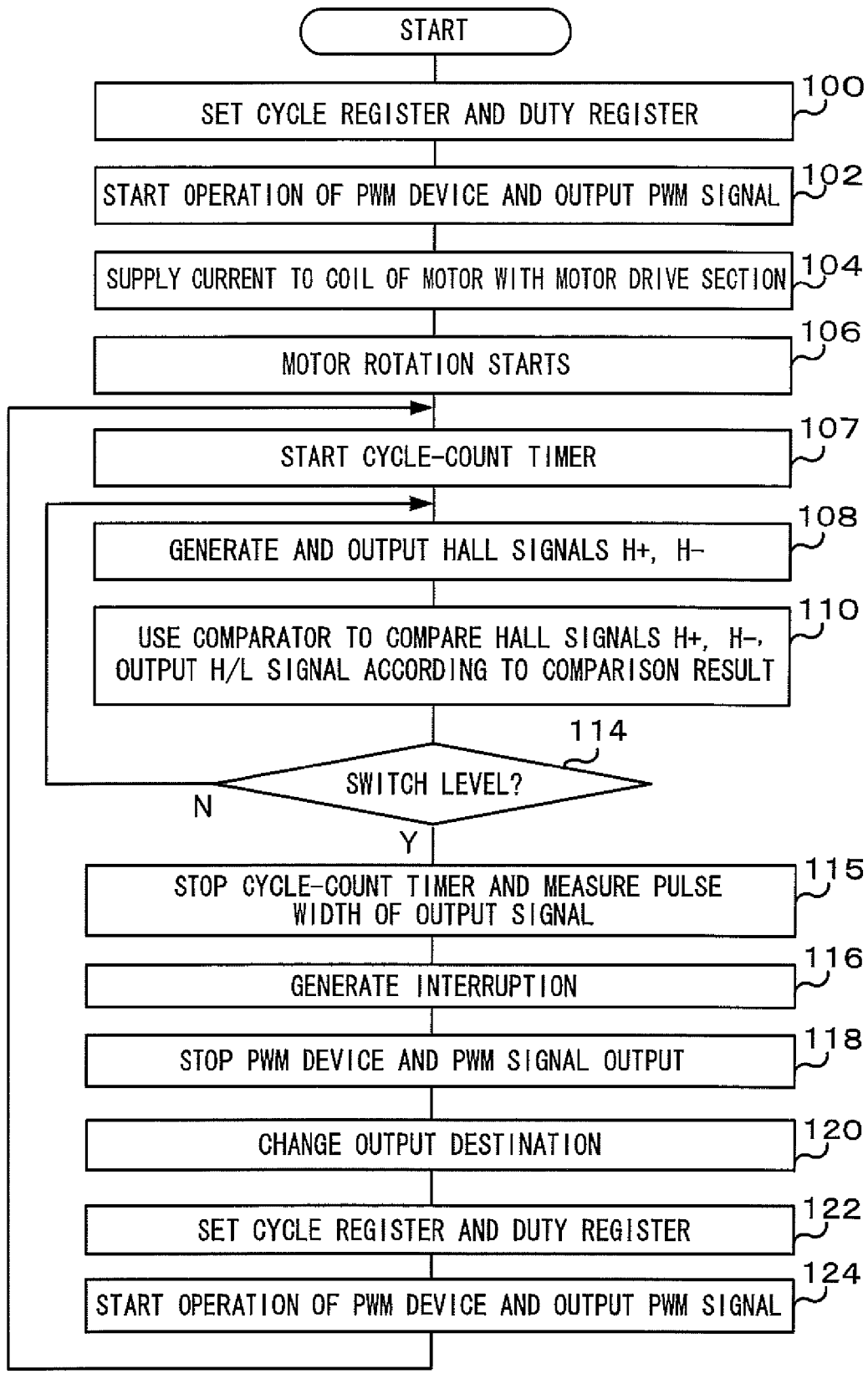
FIG. 4 is a flow chart representing an overall operation flow of a motor control system of the first exemplary embodiment.

Explanation next follows regarding operation of the motor control system 12 of the present exemplary embodiment. A flow chart representing the flow of overall operation of the motor control system 12 of the present exemplary embodiment is illustrated in FIG. 4. A timing chart of the duty of the PWM signal output by the microcontroller 20 is illustrated in FIG. 5.

In order to rotate the motor 24 to drive the driven member 14, first the desired cycle and duty are set respectively in the cycle register 50 and the duty register 52 of the PWM setting register 34 (step 100 of FIG. 4). Note that in the present exemplary embodiment, the desired cycle and duty may be pre-stored in the ROM 38. By executing the software 39, the CPU 36 reads the desired cycle and duty from the ROM 38 and respectively sets these in the cycle register 50 and the duty register 52.

Figure 5:
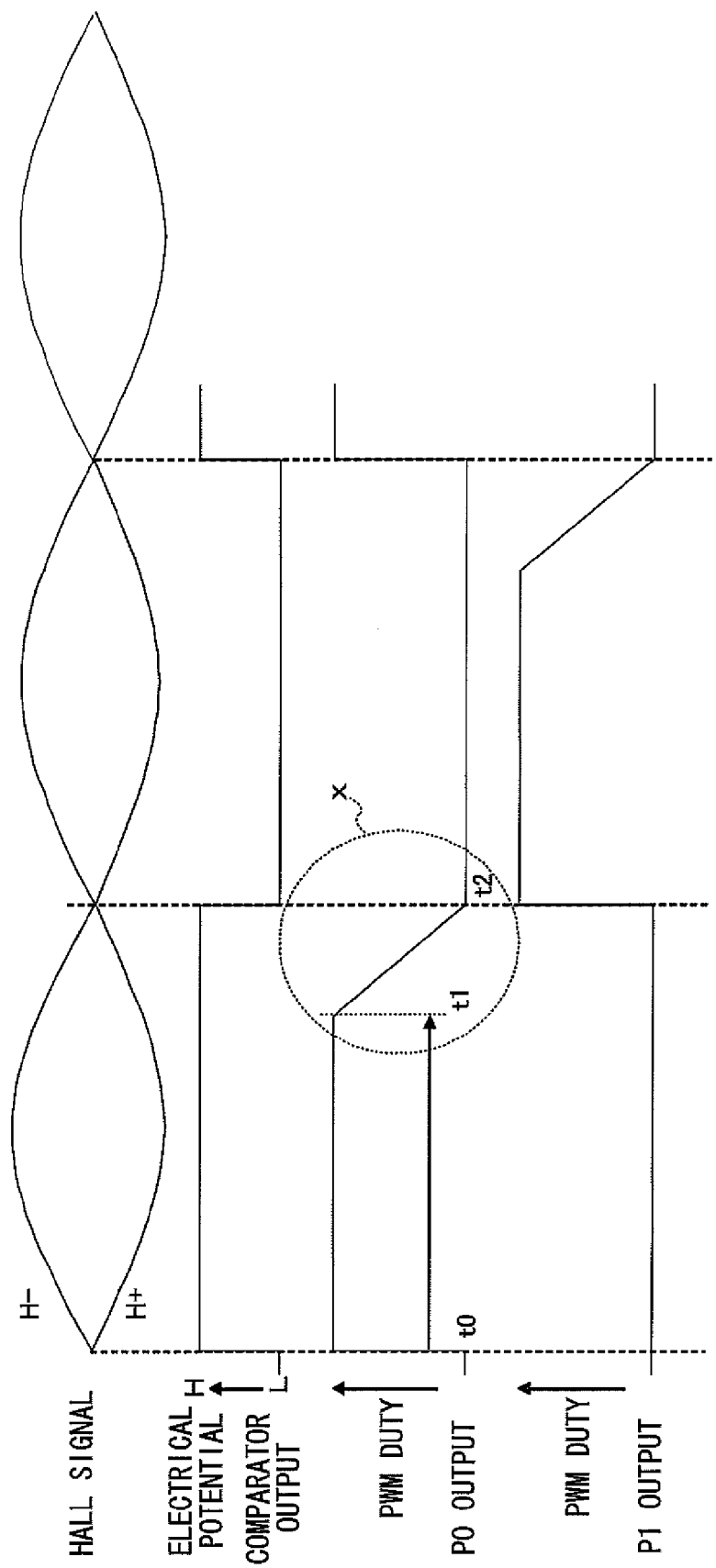
FIG. 5 is a timing chart of duty of a PWM signal output by a microcontroller of the first exemplary embodiment.

Then, after setting the cycle register 50 and the duty register 52, operation of the PWM device 30 is started (see t0 in FIG. 5). In the PWM device 30, a PWM signal is generated by the PWM generator 32 according to the setting values of the cycle register 50 and the duty register 52, and the PWM signal is output to the motor drive section 22 (step 102 of FIG. 4). In the present exemplary embodiment, the PWM signal is output from either the output terminal P0 or the output terminal P1 of the PWM generator 32 (see P0 output and P1 output in FIG. 5). A current according to the output PWM signal is then supplied to the coil 25 of the motor 24 by the motor drive section 22 (step 104 of FIG. 4). In the motor 24, a rotating magnetic field is formed by a voltage being supplied across both terminals of the coil 25, and the rotation of the rotor starts (step 106 of FIG. 4).

On starting rotation, the Hall signal H+ and the Hall signal H− synchronized to the rotation are generated by the Hall device 26 attached to the rotor, and are output to the comparator 44 of the microcontroller 20 (step 108 of FIG. 4). In the comparator 44, the magnitudes of the Hall signal H+ and the Hall signal H− are compared with each other, and an output signal of high (H) level or low (L) level is output according to the comparison result (step 110 of FIG. 4).

The level of the output signal of the comparator 44 is maintained in that state until switching (step 114=N in FIG. 4). However, an interruption is generated (step 116 of FIG. 4) at the same time as the level of the output signal is switched (step 114=Y in FIG. 4, see t2 in FIG. 5). The pulse width of the output signal of the comparator 44 is measured by the cycle-count timer 42 (step 107 and step 115 of FIG. 4). The rotation cycle of the motor 24 is then computed from the measured pulse width.

The PWM device 30 is able to switch the output destination between the two output terminals, the output terminal P0 and the output terminal P1, and output in a complementary manner at the switching timing of the level of the output signal of the comparator 44, namely at each half cycle of output from the comparator 44. Specifically, for a case as illustrated in FIG. 5, in which the PWM signal is initially output to the output terminal P0, the output of the PWM device 30 is temporarily stopped (step 118 of FIG. 4) by the software 39 (the CPU 36) that has detected an interruption from the comparator 44. Then, the output destination of the output (the PWM signal) of the PWM device 30 is changed to the output terminal P1 (step 120 of FIG. 4). Moreover, the desired cycle and duty are respectively set in the cycle register 50 and the duty register 52 (step 122 of FIG. 4), operation of the PWM device 30 is started, and the PWM signal is output from the PWM device 30 (step 124 of FIG. 4). From then onwards the operation of step 108 to step 124 of FIG. 4 is repeated until rotation of the motor 24 is stopped.

Explanation follows regarding operation in a case in which, at the end of a half cycle (rotation cycle of the motor) of the output of the comparator 44, the duty of the PWM signal output from the PWM device 30 is decreased at a constant slope by, for example, soft switching. A flow chart representing flow of a soft switching operation by the motor control system 12 in the present exemplary embodiment is illustrated in FIG. 6.

A soft switching start position (start timing) t1 according to the characteristics of the motor is determined (step 200 in FIG. 6) by the software 39 (the CPU 36) from the rotation cycle of the motor measured by the cycle-count timer 42. Note that there is no particular limitation to the determination method of the soft switching start position t1, and, for example, a correspondence relationship between the rotation cycle and the soft switching start position t1 may be pre-stored on the ROM 38, and then the soft switching start position t1 determined based on this correspondence relationship.

The timer 40 measures the elapsed time from the start position of the rotation cycle of the motor (see t0 in FIG. 5), and, at a point in time when the elapsed time is t1 (step 202=Y in FIG. 6), uses the software 39 (the CPU 36) to set given values in the duty update cycle register 54, the duty update value register 56 and the duty update-times number register 58 of the PWM setting register 34 according to characteristics of the motor.

Figure 6:
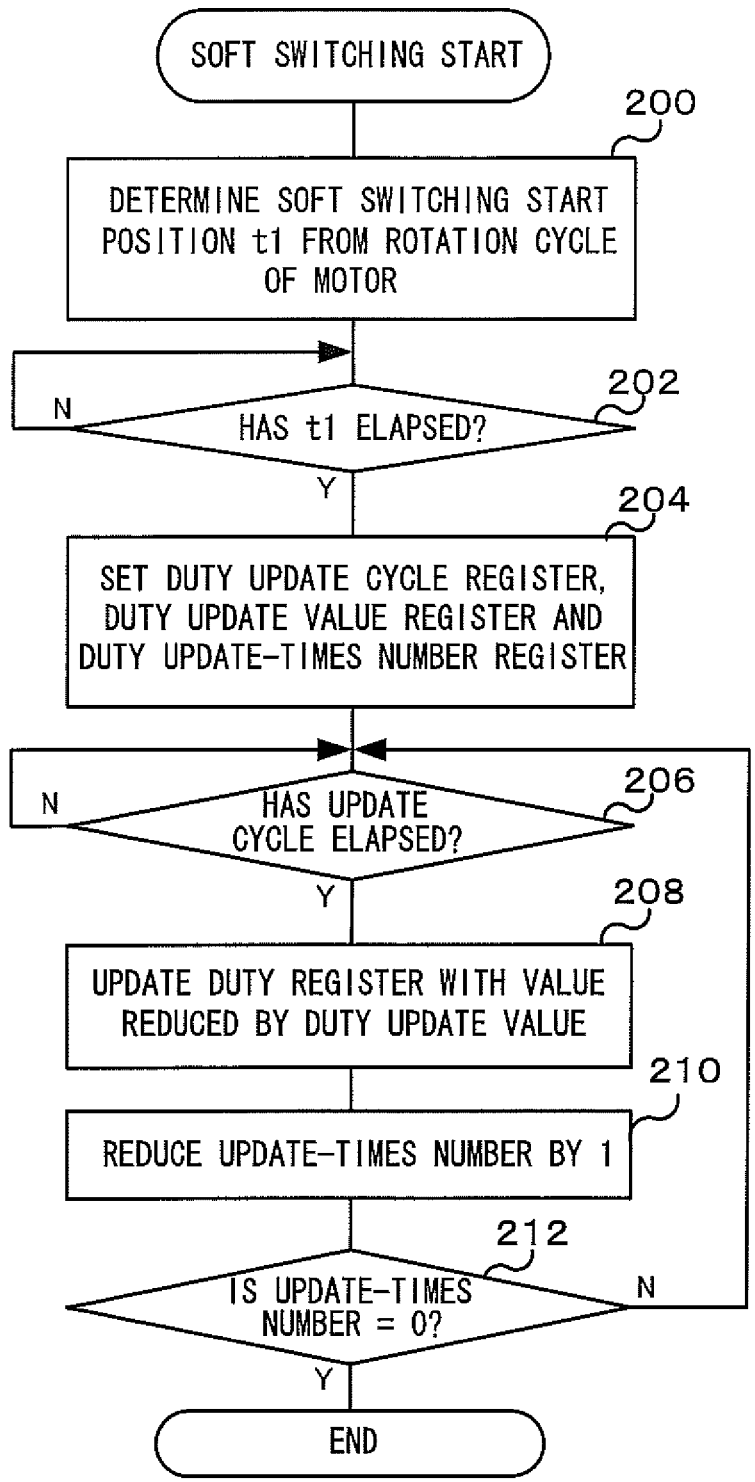
FIG. 6 is a flow chart representing a flow of a soft switching operation by a motor control system of the first exemplary embodiment.

In the PWM device 30 of the present exemplary embodiment, when the value set in the duty update-times number register 58 is "1" or greater, the current value of the duty set in the duty register 52 is updated by changing by the value set in the duty update value register 56 (step 208 in FIG. 6) each time the time set in the duty update cycle register 54 elapses (step 206=Y in FIG. 6). The PWM device 30 of the present exemplary embodiment executes this operation for the number of times set in the duty update-times number register 58.

Consequently, the PWM signal is generated when the value of the duty set in the duty register 52 has been updated, thereby being reflected in the output from the PWM device 30. More specifically, the PWM device 30 generates and outputs a PWM signal of pulse width according to the updated duty. The value set in the duty update-times number register 58 is reduced by one each time the duty is updated (step 210 of FIG. 6). Updating of the duty register 52 is repeated (step 212 of FIG. 6) until the set value becomes "0". Then, updating of the duty register 52 is not performed subsequently to when the set value has become "0" (step 212=Y in FIG. 6).

Note that in the present exemplary embodiment configuration is made such that the value set in the duty update-times number register 58 is reduced by one each time the duty is updated, and updating of the duty register 52 is not performed after the set value has become "0". However, the present invention is not limited thereto. For example, configuration may be made such that the value set in the duty update-times number register 58 is increased by one each time the duty is updated, and updating of the duty register 52 is not performed after the set value has exceeded a specific value.

Figure 7:
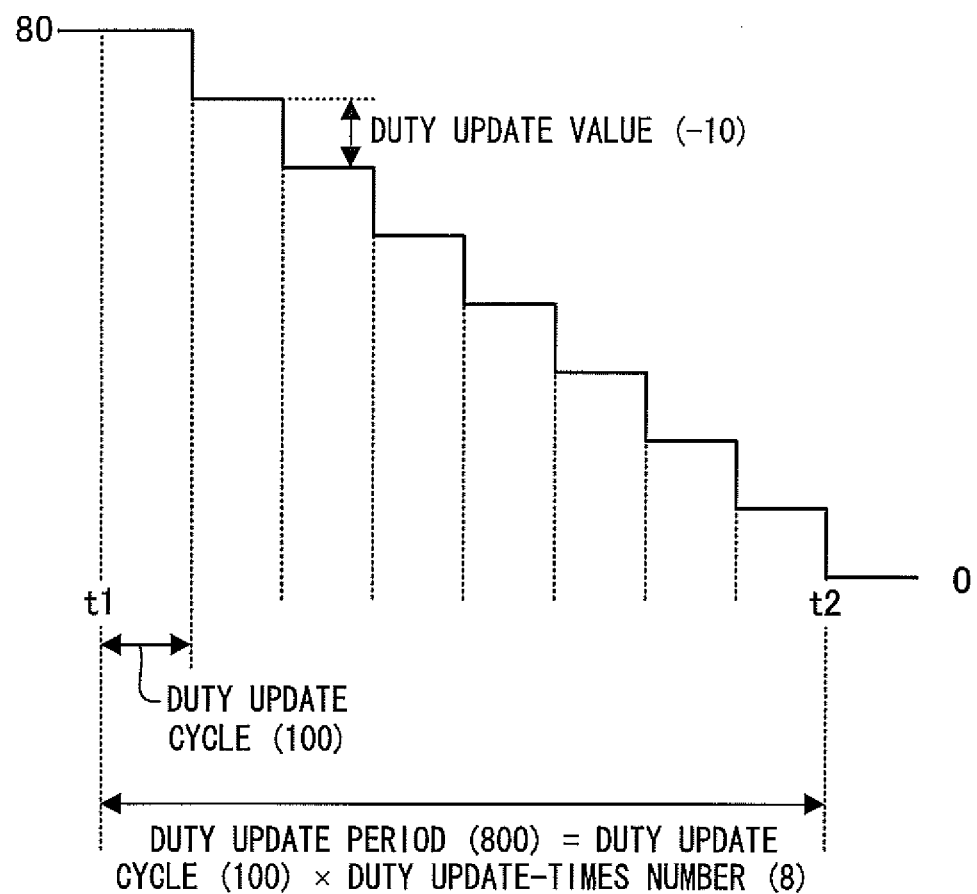
FIG. 7 is an enlarged timing chart of duty of a PWM signal output by a soft switching operation of the first exemplary embodiment.

A specific example follows of a case of reducing the duty of the PWM signal at the tail of the rotation cycle of the motor. Explanation follows regarding a case in which the value of the duty register 52 is set at "80", the value of the duty update cycle register 54 is set at "100", the value of the duty update value register 56 is "−10" and the value of the duty update-times number register 58 is set at "8". A timing chart of duty of a PWM signal output in such a case is illustrated in FIG. 7. Note that FIG. 7 is an enlarged view of the portion encircled by dotted line x in the timing chart of FIG. 5.

The value set in the duty update value register 56 is changed by −10 each time that the 100 counts (counts of the operation clock of the PWM device 30 in the present exemplary embodiment) set in the duty update cycle register 54 have elapsed, such that duty of the output signal (PWM signal) of the PWM device 30 progresses in the sequence 70, 60, 50 and so on to 10, 0, changing 8 times, which is the number of times set in the duty update-times number register 58. As may be seen from FIG. 7, the duty update period in such cases is 800 counts (the duty update cycle 100×the duty update-times number 8=800).

Note that although explanation has been given above of a case in which the duty of the PWM signal is reduced at the tail of a rotation cycle of the motor, setting may be made to increase from 0 the duty of the PWM signal at the head of a motor rotation cycle (see t0 of FIG. 5). As a specific example in such a case, explanation follows regarding a case in which the value of the duty update cycle register 54 is set at "100" at the head of a motor rotation cycle, the value of the duty update value register 56 is set at "+10" and the value of the duty update-times number register 58 is set at "8". The duty of the output signal (PWM signal) of the PWM device 30 is changed by +10, this being the value set in the duty update value register 56, each time the 100 counts (counts of the operation clock of the PWM device 30 in the present exemplary embodiment) set in the duty update cycle register 54 have elapsed such that duty of the output signal (PWM signal) of the PWM device 30 progresses in the sequence 10, 20, 30 and so on to 70, 80, changing 8 times, which is the number of times set in the duty update-times number register 58. Similarly to as described above, the duty update period in such cases is 800 counts (the duty update cycle 100×the duty update-times number 8=800), Moreover, configuration may be made such that at a given timing part way through the above stepwise changing of the duty, values in the duty update cycle register 54, the duty update value register 56 and the duty update-times number register 58 are updated, such that the duty change amount is changed partway through the stepwise changing. In such cases, updating of the duty may be stopped at this point in time by setting the value of the duty update-times number register 58 to "0" partway through.

The duty of the PWM signal output by the PWM device 30 is increased in cases in which the speed of the motor is increased, however in such cases, sometimes the cycle of the output signal of the comparator 44 is changed, and an interruption from the comparator 44 is generated partway through output of the PWM signal from the PWM device 30. In such cases, similarly to in the conventional technology, output of the PWM device 30 is stopped by the software 39 that has detected the interruption, enabling switching over the output terminal (P0 or P1) from which the PWM signal has been output up to then, to the other output terminal (either P1 or P0).

As explained above, the microcontroller 20 of the motor control system 12 in the present exemplary embodiment includes the PWM device 30 equipped with the PWM setting register 34. The PWM setting register 34 includes the duty update cycle register 54, the duty update value register 56, and the duty update-times number register 58. The PWM generator 32 generates and outputs a PWM signal according to the values set in each of the registers in the PWM setting register 34.

Thus, in the present exemplary embodiment, in order for the PWM device 30 to perform soft switching, the PWM signal may be generated and output automatically by the PWM generator 32 according to setting values set in the PWM setting register 34, even without an interruption by the software 39 (the CPU 36). Consequently, the processing load of the software 39 (the CPU 36) may be reduced in the present exemplary embodiment.

Moreover, in the present exemplary embodiment, the start timing of the soft switching operation may be set using the software 39 to a given timing according to the characteristics of the motor and other operational conditions. Moreover, in the present exemplary embodiment, the change amount of the duty of the PWM signal may be controlled at will. Consequently, in the present exemplary embodiment, even in cases in which the motor 24 is replaced with one of a different type, by replacing the processing of the software 39, a motor control signal may be easily adjusted according to the type and characteristics of the motor, without resorting to hardware updates.

Consequently, in the present exemplary embodiment, a given control signal may be easily generated even with a comparatively low cost and low processing power microcontroller.

Second Exemplary Embodiment

In the present exemplary embodiment, similar configuration and operation to that included in the configuration and operation of the first exemplary embodiment is noted, and further detailed explanation thereof is omitted. The overall configuration of an electrical device 10 of a motor control system 12 is similar to that of the first exemplary embodiment (see FIG. 1), and further explanation thereof is omitted.

Figure 8:
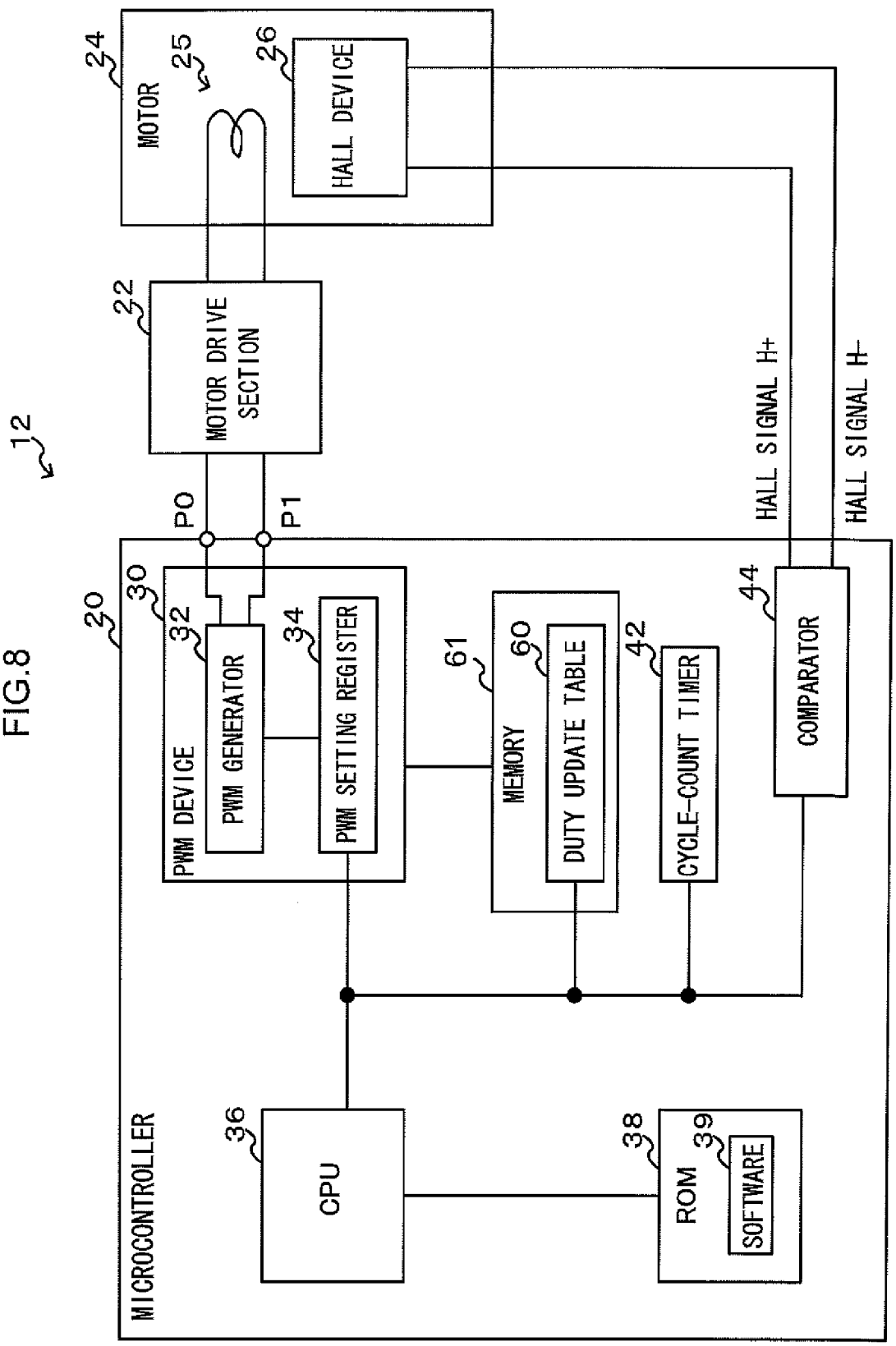
FIG. 8 is a schematic configuration diagram schematically illustrating a configuration of a motor control system of a second exemplary embodiment.

In the present exemplary embodiment, a configuration of a microcontroller 20 equipped with a motor control system 12 is different to that of the first exemplary embodiment, and so explanation follows regarding the configuration of the motor control system 12 and the microcontroller 20. FIG. 8 is a schematic configuration diagram illustrating an example of a motor control system 12 of the present exemplary embodiment.

The motor control system 12 of the present exemplary embodiment includes a duty update table 60 in place of the timer 40 that the motor control system 12 of the first exemplary embodiment is equipped with. More specifically, a memory 61 holding the duty update table 60 is included. The duty update table 60 is a table holding data for transmission in sequence to the duty update cycle register 54, the duty update value register 56 and the duty update-times number register 58 of the PWM setting register 34. A specific example of the duty update table 60 is illustrated in FIG. 9. Plural, specifically four types, from No. 1 to No. 4, of correspondence relationships (table) between duty update cycles, duty update values and duty update-times numbers are held in the duty update table 60 illustrated in FIG. 9.

Explanation next follows regarding an example of operation of the motor control system 12 of the present exemplary embodiment. The overall operation flow of the motor control system 12 in the present exemplary embodiment is similar to that of the first exemplary embodiment. The present exemplary embodiment differs in the operation to generate the PWM control signal, including soft switching operation, in the PWM device 30, and therefore, explanation follows regarding the operation to generate the PWM control signal in the PWM device 30.

Figure 10:
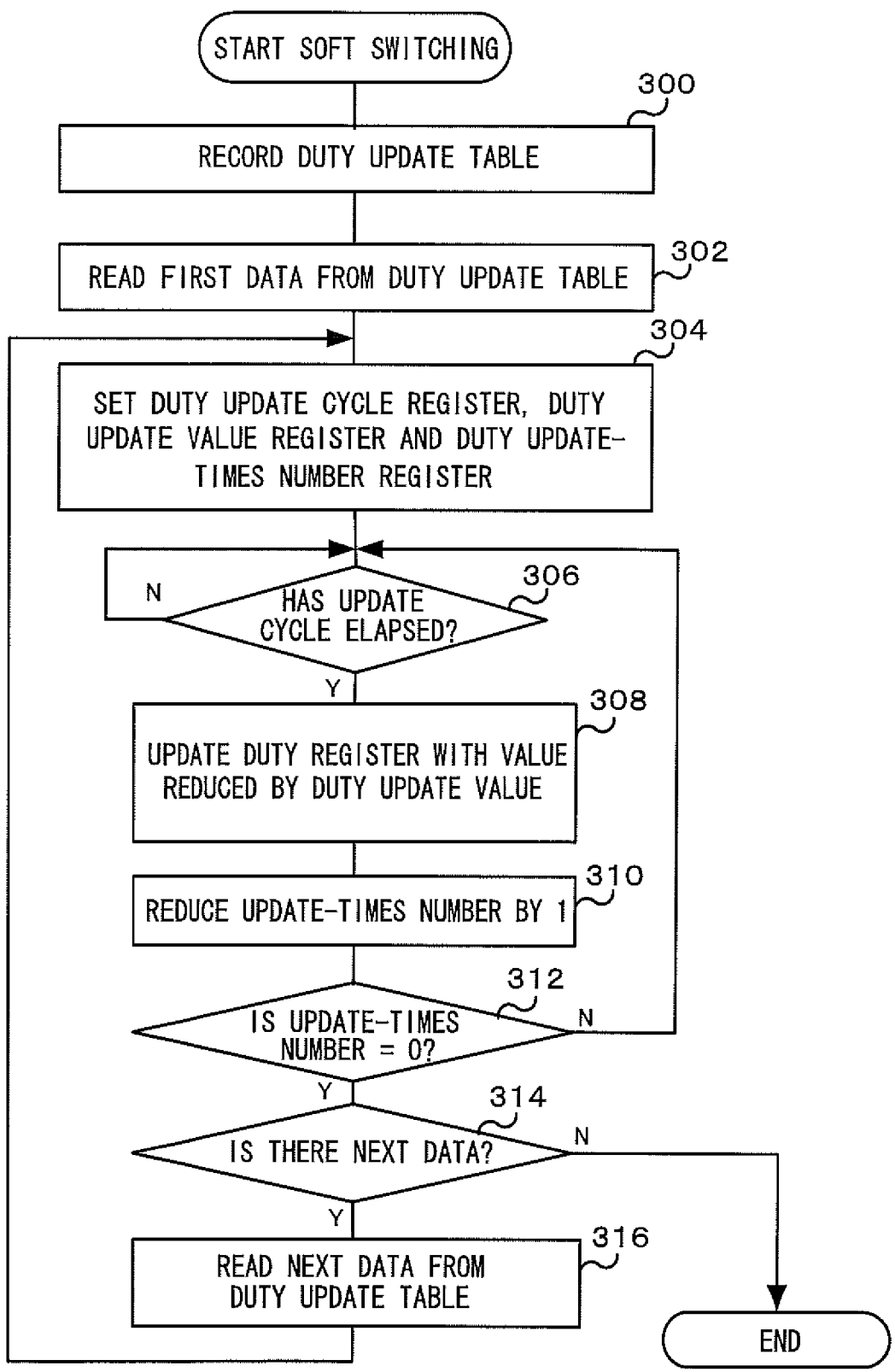
FIG. 10 is a flow chart representing an operation flow to generate a PWM control signal with a PWM device of the second exemplary embodiment.
Figure 11:
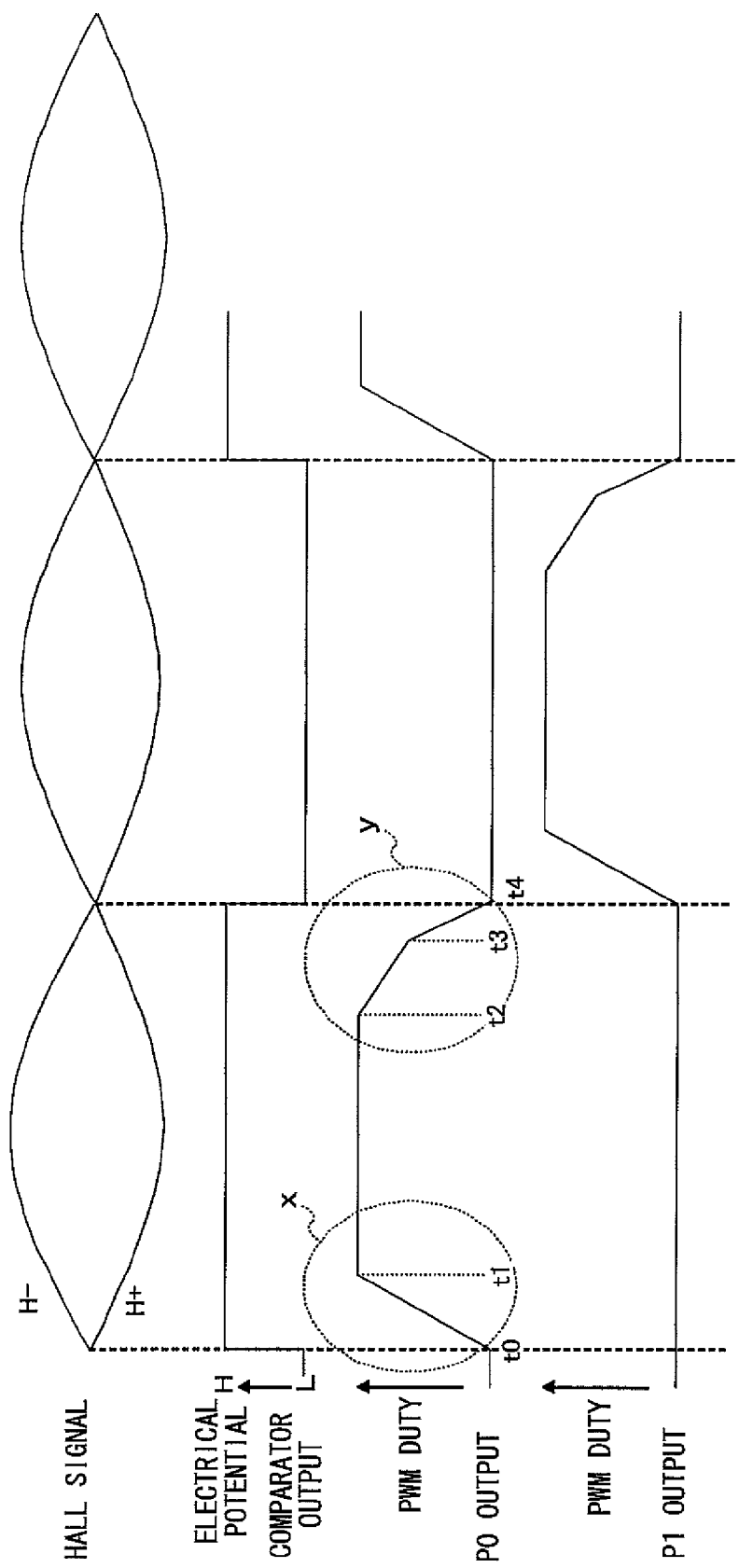
FIG. 11 is a timing chart of duty of a PWM signal of the second exemplary embodiment.
Figure 12:
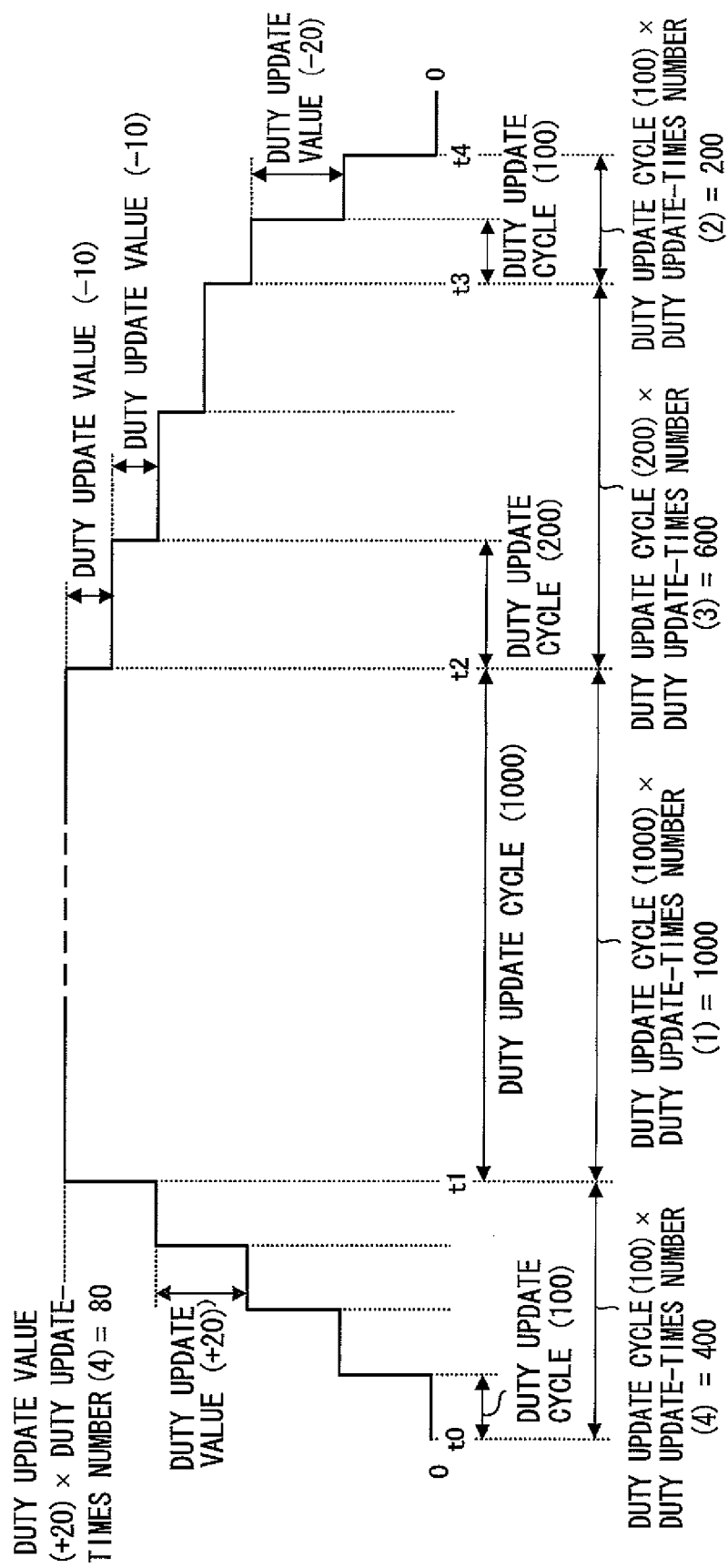
FIG. 12 is an enlarged timing chart of duty of a PWM signal output by soft switching operation in the second exemplary embodiment.

FIG. 10 illustrates a flow chart representing flow of operation to generate a PWM control signal in the PWM device 30 of the present exemplary embodiment. FIG. 11 illustrates a timing chart of duty of PWM signals output by the microcontroller 20. Further, FIG. 12 is an enlarged view illustrating the soft switching operation portions encircled by the dotted line x and the dotted line y in FIG. 11.

First, in the present exemplary embodiment, a soft switching start position (start timing) t1, from the rotation cycle of the motor measured with the cycle-count timer 42, and a duty change amount during soft switching according to the characteristics of the motor, are recorded by the software 39 (the CPU 36) in the duty update table 60 according to the change in duty in the motor rotation cycle (step 300 of FIG. 10). Note that in the present exemplary embodiment, configuration is made such that the duty update table 60 is pre-stored in the ROM 38, so as to read the duty update table 60 from the ROM 38 and recording performed therewith.

At start of rotation of the motor 24, the PWM device 30 reads (step 302 of FIG. 10) initial data of the duty update table 60 (No. 1 data in FIG. 9) at the rotation cycle start position (see t0 of FIG. 11). Then, the PWM device 30 sets each of the read values in the duty update cycle register 54, the duty update value register 56 and the duty update-times number register 58 (step 304 of FIG. 10). In the PWM generator 32, PWM signal generation is started based on the set values, and the generated PWM signal is output.

After PWM signal generation has started, operation is similar to that of step 206 to step 212 of FIG. 6 as explained in the first exemplary embodiment. Namely, in the present exemplary embodiment, processing is performed of an operation (step 308 of FIG. 10) to update the current value of the duty set in the duty register 52, by changing by the value set in the duty update value register 56 each time the period set in the duty update cycle register 54 has elapsed (step 30=Y in FIG. 10), and processing is performed to reduce the value of the duty update-times number register 58 by 1 (step 310 of FIG. 10). These two types of processing are then repeatedly executed until the duty update-times number register 58 becomes "0" (step 312).

When the duty update-times number register 58 becomes "0", determination is made as to whether or not there is next data in the duty update table 60 (step 314 of FIG. 10). In the duty update table 60 illustrated in FIG. 9, determination is made that there is next data (step 314=Y in FIG. 10) when the PWM signal based on No. 1 to No. 3 data has just been generated, the data of the next number is read from the duty update table 60 (step 316 of FIG. 10), and the then processing returns to step 304 and the present operation from there onwards is repeated.

However, in the present exemplary embodiment, operation of the PWM generator 32 is temporarily halted when the PWM signal based on No. 4 data has just been generated, since there is no next number data.

Detailed explanation follows regarding operation of the duty update table 60 as illustrated in FIG. 9. From the motor rotation cycle start point (see t0 of FIG. 11 and FIG. 12) the duty of the output signal (PWM signal) of the PWM device 30 is changed based on the No. 1 data, with the duty update value register 56 being changed by +20, which is the value set in the duty update value register 56, each time the 100 counts (the counts of the operation clock of the PWM device 30 in the present exemplary embodiment) set in the duty update cycle register 54 have elapsed, such that duty of the output signal (PWM signal) of the PWM device 30 progresses in the sequence 20, 40, 60, 80, changing 4 times, which is the number of times set in the duty update-times number register 58. As may be seen from FIG. 11 and FIG. 12, during the interval timing t0 to t1, the PWM signal based on the No. 1 data of the duty update table 60 is generated and output.

Next, based on the No. 2 data, the duty of the PWM signal is changed by −10, which is the value set in the duty update value register 56, when the 10000 counts set in the duty update cycle register 54 have elapsed, changing 1 time, which is the number of times set in the duty update-times number register 58. More specifically, the PWM generator 32 generates and outputs a PWM signal of duty 70 based on the No. 2 data of the duty update table 60 in the interval from timing t1 to t2.

Next, based on the No. 3 data, the duty of the PWM signal is changed by −10, which is the value set in the duty update value register 56, each time the 200 counts set in the duty update cycle register 54 have elapsed, changing 3 times, which is the number of times set in the duty update-times number register 58 so as to progress in the sequence 60, 50, 40. The PWM generator 32 generates and outputs a PWM signal based on the No. 3 data of the duty update table 60 in the interval from timing t2 to t3.

Next, based on the No. 4 data, the duty of the PWM signal is changed by −20, which is the value set in the duty update value register 56, each time the 100 counts set in the duty update cycle register 54 have elapsed, changing 2 times, which is the number of times set in the duty update-times number register 58 so as to progress in the sequence 20, 0. The PWM generator 32 generates and outputs a PWM signal based on the No. 4 data of the duty update table 60 in the interval from timing t3 to t4.

Note that a mechanism such as what is referred to as Direct Memory Access (DMA) may be employed as a method to read the duty update table 60 and transfer each of the data to the duty update cycle register 54, the duty update value register 56 and the duty update-times number register 58 directly, and not via the CPU 36. Using such a specification enables the processing load on the CPU 36 to be reduced even further.

Note that the duty update table 60 illustrated in FIG. 9 is merely an example, and the definition of the duty update table 60 is not limited to the above. For example, an example of a duty update table 60 illustrated in FIG. 13 represents soft switching operation similar to that of the duty update table 60 illustrated in FIG. 9. The duty update table 60 illustrated in FIG. 13 differs from the duty update table 60 illustrated in FIG. 9 in that the No. 2 data and the No. 3 data is different, however both generate a PWM signal, such as that illustrated in FIG. 12.

As explained above, in the present exemplary embodiment, plural values for setting in the duty update cycle register 54, the duty update value register 56 and the duty update-times number register 58 of the PWM setting register 34 are pre-recorded in the duty update table 60, thereby enabling these setting values to be automatically successively read into, and reflected in, each of the registers.

Thus in the present exemplary embodiment, given PWM signals may be obtained automatically over all regions of motor rotation cycle by setting the manner by which the duty is updated, with this setting occurring once at the operation start of the PWM device 30. Thus in the present exemplary embodiment, in addition to the advantageous effects obtained by the first exemplary embodiment, the processing load on the software 39 (the CPU 36) may also be further reduced, and may enable a given control signal to be easily generated for a comparatively even lower cost and lower processing power microcontroller.

Note that in each of the exemplary embodiments described above, once duty update has been completed the number of times of the value set in the duty update-times number register 58, an interruption may be generated from the PWM device 30 to the CPU 36. In the first exemplary embodiment, duty update processing may be continued with newly set values by setting new values successively in the duty update cycle register 54, the duty update value register 56 and the duty update-times number register 58 using the software 39 at a timing of interruption generation. Moreover, similarly in the second exemplary embodiment, an interruption may be generated when the duty update processing has been completed according to one set of data read from the duty update table 60. Duty update processing may then continue to be performed by adding new data to the duty update table 60 using the software 39 at the timing of interruption generation, and successively reading these values into the duty update cycle register 54, the duty update value register 56 and the duty update-times number register 58.

Moreover, in each of the above exemplary embodiments, cases have been given in which the duty of the PWM signal generated by the PWM device 30 is raised and the motor rotation speed is increased, and during PWM signal output, an interruption is generated when the level of the output signal of the comparator 44 switches, so that the output of the PWM device 30 is stopped by the software 39 that has detected the interruption. However, there is no limitation thereto. For example, configuration may be made such that the PWM device 30 detects the interruption itself and automatically stops output, so as to switch over the output terminal of the output destination (P0 or P1) to the other output terminal. By adopting such a configuration, stop processing of the PWM device 30 and processing to switch over the output terminal by the software 39 may be omitted, and since it suffices to perform output setting of the half cycle of the next comparator 44 output (setting each of the values in the PWM setting register 34) and perform output start processing, the response speed for processing to stop output of the PWM device 30 and to switch the output destination may be raised.

Note that data stored in the PWM setting register 34 is not limited to that mentioned in each of the above exemplary embodiments. The data stored in the PWM setting register 34 may be control data for generating a PWM signal with the PWM generator 32, or may be data that at least includes data representing the PWM signal for generation, and data for representing the update (change) of the PWM signal. In each of the above exemplary embodiments, duty update values are employed as data representing the PWM signal, however there is no limitation to data representing a change amount the current duty, and, for example, data of the duty after the change may be employed. Moreover, although in each of the above exemplary embodiments duty update cycle and duty update-times numbers are employed as data representing an update of PWM signal, there is no limitation thereto. For example, data of all the duty update timings may be employed. Moreover, for example, configuration may be made such that a threshold value of duty is set as update data, the updated duty compared with the threshold value, and a timing when the threshold value is exceeded taken as an update timing.

Note that there are no particular limitations to the motor 24 in each of the above exemplary embodiments. For example, a single phase brushless DC motor may be employed. Moreover, in cases in which the microcontroller 20 is equipped with plural of the PWM devices 30, configuration may be made so as to control a multi-phase motor. For example, to drive a 3-phase motor, PWM devices 30 are installed for 3 channels for the 3 coils of the motor, and it is possible to configure the motor control system 12 to output a given PWM signal according to setting values of the PWM setting register 34 for each of the coils 25 of the motor 24.

Moreover, in each of the above exemplary embodiments, a register is employed for the PWM setting register 34, and the memory 61 is employed in the duty update table 60, however there is no particular limitation thereto, as long as necessary data (values) are respectively stored therein. Note that higher speeds may be achieved by employing a register than a memory.

Moreover, configuration may be made such that, in the electrical device 10, when the driven member 14 is replaced by a different driven member, the CPU 36 of the microcontroller 20 detects replacement of the driven member 14, and values are set in the PWM setting register 34, or setting/recording of the duty update table 60 is performed, such that the motor 24 is operated according to the replaced driven member 14.

Moreover, the configurations, operations and the like of for example the electrical device 10, the motor control system 12, the microcontroller 20 and the PWM device 30 explained in each of the above exemplary embodiments are merely examples thereof, and obviously modifications are possible thereto according to the circumstances within a range not departing from the spirit of the present invention.

What is claimed is:

1. A semiconductor device comprising:
    a control data storage section that stores control signal data including a duty ratio for generating a pulse width modulation (PWM) signal for controlling operation of a drive section, and control data including an update cycle, an update value, and an update-times number of the duty ratio of the PWM signal;
    a control signal generation section that generates the PWM signal based on the control signal data;
    a storage control section that controls storage of control data in the control data storage section; and
    a notification section that notifies an updating timing of the control signal data to the control signal generation section based on the update cycle, wherein the control signal generation section updates the control signal data based on the update value included in the control data in response to the notification, and generates the PWM signal based on the updated control signal data, and wherein the control signal generation section repeats the update in response to the notification based on the update-times number.

2. The semiconductor device of claim 1, wherein the notification section notifies a timing for generating at least one of the PWM signal that starts operation of the drive section or the PWM signal that stops operation of the drive section.

3. The semiconductor device of claim 1, further comprising:

a holding section that holds a plurality of sets of the control data, wherein the storage control section controls such that the plurality of sets of control data held in the holding section are sequentially stored in the control data storage section in response to generation of the PWM signal by the control signal generation section.

4. The semiconductor device of claim 3, wherein the plurality of sets of the control data held in the holding section is control data for generating a plurality of the PWM signals that accords with operation of the drive section through from the PWM signal that starts operation to the PWM signal that stops operation.

5. An electrical device comprising:

the semiconductor device of claim 1;

the drive section whose operation is controlled by the PWM signal generated by the semiconductor device; and a driven member that is driven by the drive section.

6. A pulse width modulation (PWM) signal generation method comprising:

storing in a control data storage section control signal data including a duty ratio for generating a PWM signal for controlling operation of a drive section and control data including an update cycle, an update value, and an update-times number of the duty ratio of the PWM signal;

generating a PWM signal based on the control signal data;

updating the control signal data based on the update value included in the control data in response to the update cycle;

generating the PWM signal based on the updated control signal data; and repeating the update of the control signal data every time the update cycle comes for number of times according to the update-times number.

\* \* \* \* \*